O. LE BEAU.
LOCK FOR DEMOUNTABLE RIMS.
APPLICATION FILED JULY 7, 1916.
1,287,708. Patented Dec. 17, 1918.
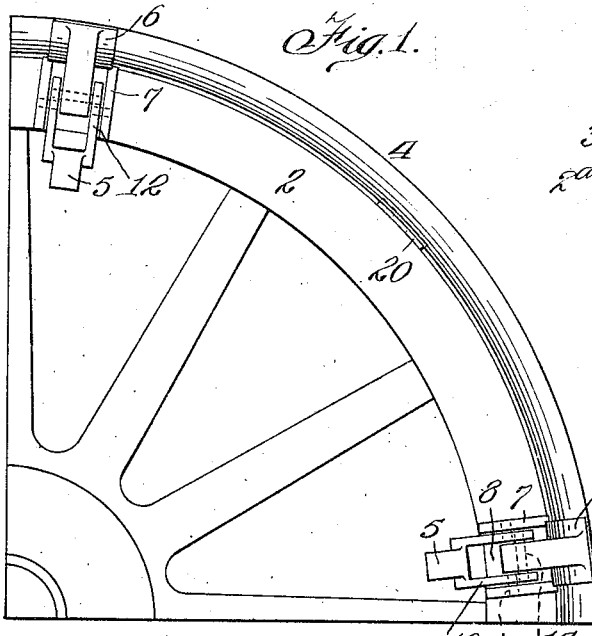
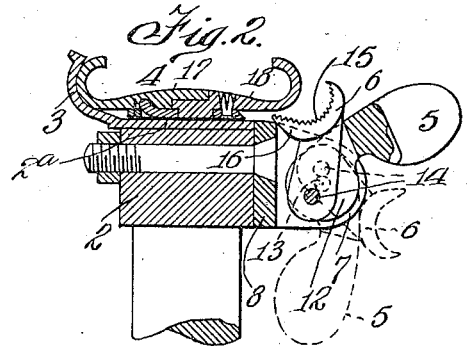
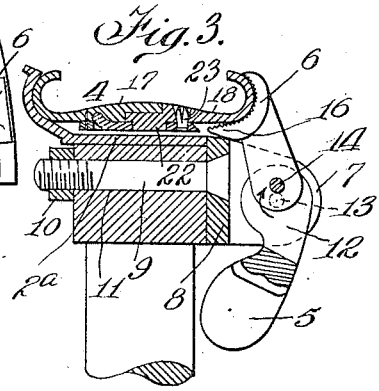
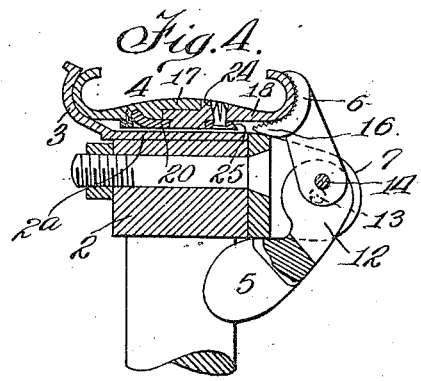
INVENTOR
OLIVIER LEBEAU
BY ATTORNEY

UNITED STATES PATENT OFFICE.

OLIVIER LE BEAU, OF MONTREAL, QUEBEC, CANADA.

LOCK FOR DEMOUNTABLE RIMS.

1,287,708.     Specification of Letters Patent.     Patented Dec. 17, 1918.

Application filed July 7, 1916. Serial No. 108,019.

*To all whom it may concern:*

Be it known that I, OLIVIER LE BEAU, a subject of the King of Great Britain, and resident of the city of Montreal, Province of Quebec, Canada, have invented certain new and useful Improvements in Locks for Demountable Rims; and do hereby declare that the following is a full, clear, and exact description of same.

This invention relates to devices for releasably locking demountable rims, for wheels of automobile and other vehicles, in position upon the wheel.

An object of the invention is to provide an improved device for locking the rim in place and one which is more readily operated and convenient than those heretofore in use.

For full comprehension, however, of my invention reference should be had to the accompanying drawings forming a part of this specification, in which similar reference characters indicate the same parts and wherein:

Fig. 1 is a segment of a wheel with my improved rim and lock applied thereto; and Figs. 2, 3 and 4 are enlarged transverse sections through the rim and felly and illustrating successive positions of the lock.

Referring now to the drawings 2 indicates the felly of a wheel and 2ª the metallic band fixed thereon, such band carrying at one side the annular outwardly extending stationary flange 3 between which and displaceable locking means the demountable rim 4 is clamped and held in place as is usual with demountable rims.

My improved displaceable locking means consists of a suitable number of locking elements spaced around the wheel and each consisting of a lever 5 pivotally mounted at one end to the wheel and a rim engaging jaw 6 pivoted to the lever eccentrically with respect to the pivotal mounting of the latter.

In order that the rim lock can be applied to wheels of usual construction and so avoid the necessity for special construction I have mounted the lever 5 between spaced arms 7 of a U-shaped bracket 8 which latter is conveniently mounted upon the slide of the felly by means of a bolt 9 and nut 10, the bolt being accommodated in the transversely extending hole 11 usually found in the felly for the reception of the bolt which attaches the rim lock in use at the present time. The U-bracket fits flat against the felly with the arms 7 extending outwardly and having the pivoted inner end of the lever 5 carried therebetween, such pivoted end being forked to form spaced lugs 12 between which the inner end of jaw 6 is accommodated and the pivotal connection between lever and bracket arms being formed by studs 13, which are in screw-threaded engagement with the arms 7 and extend inwardly therefrom and loosely into the lugs 12 to form trunnions for the lever. The inner end of the jaw 6 is pivoted to the lugs 12 by a pin 14 which passes through the jaw and is carried by the lugs at a point radially disposed with relation to the studs 13, it being preferred to arrange this eccentrically disposed pivot pin 14 between the inner or pivot end of the lever and the studs, that is to say on the opposite side of the studs to the free or outer end of the lever.

As seen in dotted lines Fig. 2, the lever and jaw can be swung inwardly within the felly to permit of an unobstructed application of the rim and then as shown in full lines in such figure swung to bring the jaw into engagement with the edge of the rim, the rim engaging end of the jaw being concaved at 15 in general conformity with the curvature of the rim edge to insure a snug engagement therewith and serrated to avoid any tendency to slip, one side of the jaw being constituted by a wedge shaped lip 16 adapted to enter beneath the rim.

By swinging the outer or free end of lever 5 inwardly from its preliminary outwardly extending position illustrated in full lines Fig. 2, to the inwardly extending position Fig. 3, the pivot pin 14 is moved in an arc toward the rim in the radial line of the wheel and outwardly from the rim in the axial plane of the wheel as indicated by arrow Fig. 3, the radial movement reducing the distance between the studs 13 and rim and thus springing or stretching the latter tightly around the felly and the movement in the axial plane swinging the inner end of the jaw outwardly and consequently swinging the outer or rim engaging end inwardly to force the rim tightly against the stationary flange 3 and wedge the lip 16 beneath the rim and tightly secure the rim upon the felly. When as shown in Fig. 4, the lever has been swung inwardly as far as possible that is when its free end engages the underside of the felly, the pivot 14 has been forced outwardly in the axial line of the wheel past dead center position with relation to studs 13 and consequently until released by the outward swinging of the lever the jaw is locked in its engagement with the rim because continued outward movement of the pivot 14 is prevented by the stalling of the free end of the lever against the felly while inward movement of such pivot past dead center again is prevented by the inward pressure of the rim due to its previous stretching. While I have illustrated a novel two-part rim I do not herein describe or claim same as it forms the subject matter of a divisional application filed by myself.

What I claim is as follows:

1. In combination, a wheel, a demountable rim for the wheel, locking members adapted to engage the rim and levers respectively pivoted to the members for moving same outwardly in the radial line of the wheel and inwardly in the axial plane of the wheel.

2. In combination, a wheel, a demountable rim for the wheel and devices for locking the rim upon the wheel, each of said devices including a lever pivotally mounted near one end upon the wheel and a rim engaging jaw pivoted to the lever between the pivot of the latter and the pivot end of same.

3. In combination, a wheel, a demountable rim for the wheel and devices for locking the rim upon the wheel, each of said devices including a lever pivoted to the wheel, a member pivoted to the lever at a point disposed eccentrically with relation to the pivot of said lever, such member being adapted in its locking position to engage the inner side of the rim and have its pivot point disposed off dead center position with relation to the pivot of the lever and on that side of such pivot which is outward in the axial plane of the wheel.

4. In combination, a wheel, a demountable rim for the wheel, rim locking members each of which has a tapered lip adapted to enter beneath the rim and levers respectively pivoted to said members and adapted to move the same outwardly in the radial line of the wheel and inwardly in the axial plane of the wheel.

5. In combination, a wheel, a demountable rim for the wheel and rim locking devices each including a bracket carried by the felly, a lever pivoted at one end to the bracket and a rim engaging jaw pivoted to the lever at a point between the pivot of the lever and the pivot end of such lever, the free end of the jaw being concaved in general conformity with the rim and presenting a tapered lip adapted to enter beneath the rim.

6. In combination, a wheel the felly of which has holes extending transversely therethrough, a demountable rim for the wheel and rim locking devices each including a U-bracket, a bolt passing through one of said holes in the felly and attaching the bracket to the latter, a nut securing the bolt, a lever pivoted at one end between the arms of the bracket and a rim engaging jaw pivoted to the lever at a point between the pivot of the lever and the pivot end of such lever, the free end of the jaw being concaved in general conformity with the rim, serrated and presenting a tapered lip adapted to enter beneath the rim.

7. In combination, a wheel, the felly of which has holes extending transversely therethrough, a demountable rim for the wheel and rim locking devices each including a U-bracket, a bolt passing through one of said holes in the felly and attaching the bracket to the latter, a nut securing the bolt, a forked lever, studs in screw-threaded relation with the arms of the U-bracket and loosely entering the sides of the lever near its forked end, and a rim engaging jaw pivoted to the lever within its forked end at a point between the studs and the pivot end of such lever, the free end of the jaw being concaved in general conformity with the rim, serrated and presenting a tapered lip adapted to enter beneath the rim.

In testimony whereof, I have signed my name to this specification.

OLIVIER LE BEAU.